United States Patent [19]

Quadir

[11] Patent Number: 4,764,491
[45] Date of Patent: Aug. 16, 1988

[54] LOW TEMPERATURE SINTERING OF YTTRIA STABILIZED ZIRCONIA WITH LANTHANA BORATE ADDITIONS

[75] Inventor: Tariq Quadir, Grand Blanc, Mich.
[73] Assignee: General Motors Corporation, Detroit, Mich.
[21] Appl. No.: 48,561
[22] Filed: May 11, 1987
[51] Int. Cl.$^4$ .............................................. C04B 35/48
[52] U.S. Cl. ..................................... 501/103; 501/152
[58] Field of Search ........................ 501/103, 126, 152
[56] References Cited

U.S. PATENT DOCUMENTS

| | | | |
|---|---|---|---|
| 3,862,283 | 1/1975 | Rhodes ................................. | 501/152 |
| 4,115,134 | 9/1978 | Rhodes ................................. | 501/126 |
| 4,336,339 | 6/1982 | Okumiya et al. .................... | 501/103 |

OTHER PUBLICATIONS

Lange, Transformation Toughening, Journal of Materials Science, vol. 17, pp. 240-246, 1982.

Primary Examiner—William R. Dixon, Jr.
Assistant Examiner—David M. Brunsman
Attorney, Agent, or Firm—Domenica N. S. Hartman

[57] ABSTRACT

Yttria stabilized zirconia materials are sintered using low temperature liquid phase sintering techniques. A fugitive sintering aid, lanthana borate, is combined with the yttria stabilized zirconia in sufficient amounts to effect the liquid phase sintering. The material is sintered by heating to about 1390° C. for a duration of about two hours. The resulting sintered yttria stabilized zirconia is characterized by a fine microstructure and improved low temperature stability.

8 Claims, No Drawings

LOW TEMPERATURE SINTERING OF YTTRIA STABILIZED ZIRCONIA WITH LANTHANA BORATE ADDITIONS

FIELD OF THE INVENTION

The present invention generally relates to yttria stabilized zirconia ceramic materials. More specifically this invention relates to a method of sintering such materials at reduced temperatures using liquid phase sintering techniques.

BACKGROUND OF THE INVENTION

Zirconium oxide, also referred to as zirconia or $ZrO_2$, undergoes a stress induced phase transformation within its crystalline structure in the temperature range of about 200° C. to about 250° C. Stresses associated with propagating crack fronts within the zirconium oxide provide the driving force for the phase transformation from the metastable tetragonal phase to the stable monoclinic phase. This phase transformation from the metastable tetragonal phase to the stable monoclinic phase results in about a four percent volume increase within the crystal lattice of the zirconia material. A stable cubic phase, which does not undergo a phase transformation, is also present within the crystal lattice of the zirconium oxide.

It is generally known that the metastable tetragonal phase may be retained at lower temperatures by combining yttrium oxide, also referred to as yttria or $Y_2O_3$, in the range of about 2.0 to 2.8 mole percent, with the zirconia crystals—hence the common nomenclature yttria stabilized zirconia. Retention of the metastable tetragonal phase is further maximized by maintaining the grain size of the zirconia below a critical grain size value. The critical grain size is defined as that grain size below which the transformation from tetragonal phase to monoclinic phase is thermodynamically unfavorable. If the grain size is maintained below the critical grain size value, the crystalline matrix constrains the transformation within the zirconia crystals and the metastable tetragonal phase is retained. Therefore, the low temperature stability of yttria stabilized zirconia is directly related to the amount of metastable tetragonal phase which does not transform to the stable monoclinic phase, and is optimized when the yttria stabilized zirconia is characterized by grain sizes smaller than the critical grain size value, i.e., a fine microstructure.

The microstructure of the yttria stabilized zirconia material is related to the sintering process, in particular the sintering temperature at which densification of the powder occurs. It is generally known that as the sintering temperature of a material is reduced, the resulting grain size of the material becomes smaller and therefore a finer microstructure is produced. Two means for reducing sintering temperatures of the yttria stabilized zirconia powders are: (1) the use of ultrafine powders and (2) the use of liquid phase sintering techniques. Typically, zirconia powders are sintered in the temperature range of 1500°–1700° C. With improved processing techniques and ultrafine powder, the sintering temperature for this material has been reduced to about 1450° C. However, using ultrafine ceramic powders is generally considered impractical on a mass production scale.

Liquid phase sintering produces rapid densification of the ceramic powders at low temperatures and has been used to effect low temperature densification of ceramic powders. A liquid phase sintering aid, comprising a reactive compound which forms a low viscosity liquid phase at relatively low temperatures, is utilized. The liquid phase sintering aid is required because the driving force for densification of the powders is derived from the capillary pressure of the liquid phase located between the fine solid particles. Requirements for liquid phase sintering are: (1) a sufficient amount of the liquid phase component, (2) homogeneous distribution of the liquid phase component, on a microscale, throughout the powdered mixture, (3) high solubility of the solid powdered component in the liquid component, and (4) appreciable wetting of the solid by the liquid, i.e., a low dihedral angle of wetting. In general, the amount of liquid phase should not exceed about 25 percent of the total volume and typically, significantly lesser amounts of liquid phase are sufficient.

OBJECTS AND SUMMARY OF THE INVENTION

It is an object of the present invention to provide a method for low temperature densification of yttria stabilized zirconia ceramic material.

It is a further object of this invention to provide a yttria stabilized zirconia material that is characterized by a microstructure comprising a grain size smaller than the critical grain size limit. It is still a further object of this invention to provide a material that has improved low temperature stability over conventionally sintered yttria stabilized zirconia materials.

In accordance with a preferred embodiment of this invention, these and other objects and advantages are accomplished as follows.

The present invention teaches a method of sintering powdered yttria stabilized zirconia ceramic material whereby the sintering process is achieved through low temperature liquid phase sintering techniques. Additions of a sintering aid, about four weight percent powdered lanthana borate material, are combined with powdered yttria stabilized zirconia ceramic material. The powdered lanthana borate comprises about 70 mole percent lanthanum oxide and about 30 mole percent boric oxide. The powdered mixture comprising yttria stabilized zirconia with the lanthana borate additions is sufficiently mixed to homogeneously distribute the components throughout the powdered mixture.

A green form, suitable for sintering, is produced by filling a mold with the homogeneous powdered mixture and applying about 20,000 pounds per square inch of pressure. Liquid phase sintering of the green form is achieved by heating to a sufficient temperature, about 1390° C., in an air environment for a duration of about 2 hours.

This low temperature liquid phase sintering process results in an improved yttria stabilized zirconia ceramic material. The resulting yttria stabilized zirconia material is characterized by a fine microstructure, i.e., an average grain size of about 0.20 microns, and improved low temperature stability. The material is suitable for use in any application requiring yttria stabilized zirconia such as automotive exhaust oxygen sensors as well as other suitable applications such as internal combustion engine components, extruding dies, and high temperature structural applications.

Other objects and advantages of this invention will be better appreciated from a detailed description thereof, which follows.

DETAILED DESCRIPTION OF THE INVENTION

In the present invention, low temperature liquid phase sintering of yttria stabilized zirconia is effected by combining a fugitive sintering aid, lanthana borate, with the yttria stabilized zirconia powder. Liquid phase sintering of the yttria stabilized zirconia powder is achieved at about 1390° C. using the lanthana borate additions. The result of the lower sintering temperature is a material characterized by a fine microstructure, i.e., a grain size below the critical grain size of the material. This fine microstructure subsequently improves the low temperature, i.e., temperatures below the phase transformation temperature of about 250° C. stability of the yttria stabilized zirconia material.

The yttria stabilized zirconia powder was prepared by conventional spray drying techniques and comprised about 2.2 mole percent yttria. About 700 grams of reagent grade lanthana powder was mixed with about 700 centimeters of distilled water and allowed to soak for 24 hours, in order to convert all lanthana to lanthanum hydroxide, $La(OH)_3$. About 816 grams of lanthanum hydroxide powder was produced by this method and was then added to a boron oxide, $B_2O_3$, solution and isopropenol in a lab mixer to form a slurry. The boron oxide solution consisted of about 65 grams of boron oxide dissolved in about 100 centimeters of hot distilled water. The ratio of the amount of lanthanum hydroxide to the amount of boron oxide solution was about 70:30 mole percent ratio.

The slurry comprising lanthanum hydroxide and boron oxide was then dried under a conventional heat lamp, or other suitable means, and calcined at approximately 930° C. for a duration of about two hours. The calcination process evaporates any excess boron oxide while combining the remaining amount of boron oxide with the lanthana to produce lanthanum borate. The calcined mixture consists essentially of lanthanum borate with negligible amounts of lanthanum oxide/lanthanum hydroxide. Other preparation methods which provide the lanthana borate mixture, 70:30 mole ratio, such as an in-situ method without calcination, may also be employed.

In the preferred embodiment, the zirconia is stabilized with approximately 2.2 mole percent yttria. Theoretically, the amount of yttria may be varied up to about 5.0 mole percent without any significant change in effect. However, as the amount of yttria is increased from about 3.0 mole percent to about 5.0 mole percent, the percentage of metastable tetragonal phase within the crystal lattice is significantly reduced, i.e., from about 99 volume percent at 3.0 mole percent yttria to about 20 volume percent at 5.0 mole percent yttria, and is replaced by the cubic crystal phase. As the amount of metastable tetragonal phase is reduced, the effects of the phase transformation and the accompanying volume increase within the crystal lattice on the low temperature stability of the material are also diminished.

Approximately 4.0 weight percent lanthana borate powder was combined with the 2.2 mole percent yttria stabilized zirconia powder. Four weight percent is the preferred amount of lanthana borate. However, suitable results were obtained with powdered lanthana borate additions varying between about 2.5 weight percent and about 10 weight percent.

The powdered zirconia mixture, comprising the yttria stabilized zirconia and lanthana borate additions, was ball milled using conventional techniques for 16 hours in a 2×3 mill. About 1.0 weight percent of a binder, such as CARBOWAX ™, a polyethylene glycol and about 1.25 weight percent of a milling aid, such as a hydrogenated caster oil, were added to the powdered mixture prior to milling. Sufficient mixing of the components is required to ensure that the sintering aid, lanthana borate, is distributed uniformly throughout the yttria stabilized zirconia in order to minimize localized liquid phase sintering. The milling process produces a microscopic homogeneous distribution of the powdered components and a uniform distribution of physical and chemical properties throughout the powdered mixture.

The powdered yttria stabilized zirconia mixture was then pressed into green forms suitable for sintering. Green bars, about 2.0 inches long and about 0.5 inch in diameter were formed using a Carver press and applying about 20,000 pounds per square inch of pressure using a Carver press. The density of the green bars was about 61 percent, 3.68 grams per cubic centimeter, of the theoretical density for yttria stabilized zirconia.

The green bars comprising the yttria stabilized zirconia and lanthana borate powdered mixtures were heated to about 1390° C. in a conventional air environment furnace for a duration of about 2 hours, whereby densification of the yttria stabilized zirconia occurs through liquid phase sintering. Although 1390° C. is the preferred sintering temperature, similar results were obtained with sintering temperatures ranging between approximately 1385° C. to approximately 1425° C. Two hours appears to be the optimal duration for sintering, as it ensures complete densification of the material, yet does not expose the material to excessive periods of time at the temperature which result in unnecessary grain growth. The sintering was accomplished in a conventional air environment furnace, however vacuum or non-oxidizing environments may be employed also. A reducing atmosphere may produce stoichiometric changes in the yttria stabilized zirconia.

The driving force for densification of the yttria stabilized zirconia powder through liquid phase sintering, is derived from the capillary pressure of the lanthana borate liquid phase located between the fine solid powder particles. Therefore, additional external pressure is not required during sintering. The lanthana borate forms a reactive liquid phase at low melting temperatures, about 1320° C. This lanthana borate liquid phase has low viscosity and forms a low dihedral angle of wetting with the yttria stabilized zirconia solid phase which facilitates penetration of the lanthana borate liquid phase between the solid particles in the grain boundaries. The borate in the lanthana borate liquid phase acts as a fugitive compound to effect liquid phase sintering of the material. Presumably, the borate, or boron oxide, evaporates after densification of the parent body. After the liquid phase sintering, borate can not be detected using conventional microprobe and X-ray analysis. However, the lanthana remains at the grain boundaries, which impedes grain growth of the zirconia crystals. This property is beneficial if the material is used at high temperatures.

The critical grain size requirement for zirconia stabilized with about 2.2 mole percent yttria is about 0.35 microns, determined from thermodynamic calculations. The average grain size for zirconia stabilized with about 2.2 mole percent yttria sintered in accordance with this invention was about 0.20 microns, which is significantly less than the critical grain size requirement. The grain size varied between about 0.10 to about 0.35 microns. The grain size was determined using the Zeiss Video Plan, a commercially available computerized program for determining grain size, and scanning electron photomicrographs at magnifications of 10,000 times. The grains to be measured are outlined on a photomicrograph of the microstructure, and the area within the outlined grain, or grains, is then determined by the Zeiss Video Plan computer program.

Samples of the sintered yttria stabilized zirconia material were exposed to about 1000° C. for a duration of 1000 hours to determine the effects on grain size and strength of the material. No significant grain growth was detected. The flexural strength of the sintered material prior to the test was determined to be about 106 ksi at room temperature using a 4 point bend test. After exposure to 1000° C. for 1000 hours, the flexural strength was determined to be about 103 ksi at room temperature using a 4 point bend test. No significant decrease in flexural strength occurred.

The low temperature stability of the yttria stabilized zirconia sintered in accordance with this invention was determined using a conventional autoclave test. The autoclave test is performed under about 320–350 psi of steam at 200° C. for a duration of approximately 250 hours. The yttria stabilized zirconia sintered in accordance with this invention survived the autoclave test without any showing of dye penetrant pick up which would indicate a degradation in the strength of the material. This indicates the yttria stabilized zirconia material sintered in accordance with this invention has excellent low temperature stability. Conventionally prepared and sintered yttria stabilized zirconia materials have never survived this autoclave test without some showing of dye penetrant pick up indicating a degradation in the strength of the material during these conditions. The degradation in strength was attributed to the phase transformation from tetragonal to monoclinic within the zirconia crystal lattice.

The sintered density of the yttria stabilized zirconia material sintered in accordance with this invention is approximately 5.98 grams per cubic centimeter, which is 99% of the theoretical density of this material.

Low temperature liquid phase sintering of yttria stabilized zirconia is effected by combining sufficient amounts of a liquid phase sintering aid, lanthana borate, to the yttria stabilized zirconia. The borate within the lanthana borate evaporates during the sintering process. The lanthana remains at the grain boundaries of the zirconia, which impedes subsequent grain growth within the zirconia. The resulting yttria stabilized zirconia material is characterized by a fine microstructure, i.e., grain sizes smaller than the critical grain size limit, and improved low temperature stability.

The embodiments of the invention in which an exclusive property or privilege is claimed are defined as follows:

1. A method of sintering powdered yttria stabilized zirconia ceramic material, comprising the steps of:
    combining powdered yttria stabilized zirconia material with additions of powdered lanthana borate material to produce a powder mixture comprising yttria stabilized zirconia and lanthana borate, said additions of powdered lanthana borate range between about two weight percent to about ten weight percent of said powder mixture;
    forming said powder mixture into a green form suitable for sintering; and
    heating said green form to a temperature between about 1385° C. and about 1425° C. for a duration of about two hours;
    effective to produce a sintered yttria stabilized zirconia ceramic material characterized by a fine microstructure having an average grain size between about 0.1 to about 0.35 microns and good low temperature stability.

2. A method of sintering powdered yttria stabilized zirconia ceramic material comprising the steps of:
    combining powdered yttria stabilized zirconia material with additions of about four weight percent powdered lanthana borate material to produce a powder mixture comprising yttria stabilized zirconia and lanthana borate;
    forming said powder mixture into a green form suitable for sintering; and
    heating said green form to about 1390° C. for a duration of about two hours;
    effective to produce a sintered yttria stabilized zirconia ceramic material characterized by an average grain size of about 0.20 microns and good low temperature stability.

3. A yttria stabilized zirconia ceramic material sintered in accordance with the method comprising the steps of:
    combining powdered yttria stabilized zirconia material with additions of powdered lathana borate material to produce a powder mixture comprising yttria stabilized zirconia and lanthana borate, said additions of powdered lanthana borate range between about two weight percent to about ten weight percent of said powder mixture;
    forming said powder mixture into a green form suitable for sintering; and
    heating said green form to a temperature between about 1385° C. and about 1425° C. for a duration of about two hours;
    effective to produce a sintered yttria stabilized zirconia ceramic material characterized by a fine microstructure having an average grain size between about 0.1 to about 0.35 microns and good low temperature stability.

4. A yttria stabilized zirconia ceramic material sintered in accordance with the method comprising the steps of;
    combining powdered yttria stbilized zirconia material with additions of about four weight percent powdered lanthana borate material to produce a powder mixture comprising yttria stabilized zirconia and lanthana borate;
    forming said powder mixture comprising yttria stabilized zirconia and lanthana borate into a green form suitable for sintering; and
    heating said green form to about 1390° C. for a duration of about two hours;
    effective to produce a sintered yttria stabilized zirconia ceramic material characterized by an average grain size of about 0.20 microns and good low temperature stability.

5. A sintered zirconia ceramic material with good low temperature stability, comprising:
    zirconia,
    yttria, in the range of about 0.2 mole percent to about 5.0 mole percent, and
    lanthana,
    whereby the average grain size of said zirconia is not less than about 0.1 microns and not greater than about 0.35 microns, and said grains are enveloped with said lanthana.

6. A sintered zirconia ceramic material with good low temperature stability, comprising:
   zirconia,
   yttria, about 2.2 mole percent, and
   lanthana,
   whereby the average grain size of said zirconia is about 0.20 microns, and said grains are enveloped with said lanthana.

7. A composition of matter suitable for low temperature liquid phase sintering, comprising;
   zirconia,
   yttria, said yttria ranging between about 1.0 mole percent and about 5.0 mole percent within said zirconia, and
   lanthana borate, said lanthana borate ranging between about 2.0 weight percent and 10.0 weight percent.

8. A composition of matter suitable for low temperature liquid phase sintering, comprising;
   zirconia,
   yttria, said yttria being about 2.2 mole percent within said zirconia, and
   lanthana borate, said lanthana borate being about 4.0 weight percent within the composition, and comprising about 70 mole percent lanthana and about 30 mole percent borate.

* * * * *